(12) United States Patent
Beck et al.

(10) Patent No.: US 7,150,340 B2
(45) Date of Patent: Dec. 19, 2006

(54) HUB DRIVE AND METHOD OF USING SAME

(75) Inventors: Michael S. Beck, Colleyville, TX (US); Jon T. Stinchcomb, Arlington, TX (US); Wendell H. Chun, Littleton, CO (US); David A. Clemens, Orange, CA (US); John C. Dunne, Costa Mesa, CA (US); Dean Banks, Costa Mesa, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/639,264

(22) Filed: Aug. 12, 2003

(65) Prior Publication Data

US 2004/0163863 A1    Aug. 26, 2004

Related U.S. Application Data

(60) Provisional application No. 60/449,271, filed on Feb. 21, 2003.

(51) Int. Cl.
  *B60K 17/356*  (2006.01)
  *B60K 1/00*    (2006.01)

(52) U.S. Cl. .................. 180/242; 180/65.8; 180/305

(58) Field of Classification Search ................ 180/242, 180/292, 305, 308, 369, 372, 65.8; 254/328, 254/344, 361; 475/274, 269, 301, 304, 337, 475/347; 310/67 R, 67 A, 75 B
See application file for complete search history.

(56) References Cited

U.S. PATENT DOCUMENTS

| | | | | |
|---|---|---|---|---|
| 4,162,713 A * | 7/1979 | Heitman et al. | ............ | 180/242 |
| 4,291,779 A * | 9/1981 | Mann et al. | ................ | 180/305 |
| 4,334,590 A * | 6/1982 | Plumb | ........................ | 180/372 |
| 5,474,504 A * | 12/1995 | Bay et al. | .................... | 475/274 |
| 5,525,115 A * | 6/1996 | Vanzini | ...................... | 475/269 |
| 5,528,978 A * | 6/1996 | Forster | ...................... | 475/337 |
| 5,733,218 A * | 3/1998 | Sudau et al. | ................ | 475/347 |
| 5,819,870 A * | 10/1998 | Braun | ........................ | 180/305 |
| 5,906,249 A * | 5/1999 | Monkkonen | ................ | 180/292 |
| 6,276,475 B1 * | 8/2001 | Nakanosono | .............. | 180/65.8 |
| 6,585,066 B1 * | 7/2003 | Koneda et al. | ............ | 180/65.2 |
| 6,607,049 B1 * | 8/2003 | Cigal | ........................ | 180/305 |
| 6,866,465 B1 | 3/2005 | Jester et al. | ................ | 414/556 |

\* cited by examiner

*Primary Examiner*—Hau Phan
(74) *Attorney, Agent, or Firm*—Williams, Morgan & Amerson, P.C.

(57) ABSTRACT

A hub drive includes an in-hub motor and a shifting in-hub transmission coupled with the motor. A hub drive wheel assembly includes a wheel comprising a hub, an in-hub motor, and a shifting in-hub transmission having an input attached to the motor and an output attached to the wheel. A vehicle includes a chassis, a wheel comprising a hub, an in-hub motor, and a shifting in-hub transmission having an input attached to the motor and an output attached to the wheel for rotating the wheel with respect to the chassis. A method includes providing a shifting transmission and a motor coupled with the transmission in a hub of a wheel, providing electrical power to the motor, and rotating the motor with the electrical power. The method further includes rotating the transmission with the motor and rotating the wheel with the transmission.

6 Claims, 6 Drawing Sheets

HUB DRIVE AND METHOD OF USING SAME

We claim the earlier effective filing date of co-pending U.S. Provisional Application Ser. No. 60/449,271, entitled "Unmanned Ground Vehicle," filed Feb. 21, 2003, in the name of Michael S. Beck, et al., for all common subject matter.

BACKGROUND OF THE INVENTION

1. Field of the Invention

This invention relates to a drive for rotating a wheel and, in particular, to a hub drive for rotating a wheel.

2. Description of the Related Art

Wheeled ground vehicles have been used for many years to carry personnel, cargo, and other equipment. Such vehicles generally have some means of producing a motive force to the wheels, such as an engine or motor in combination with a drive train. For example, in a rear-wheel drive automobile, an engine generates the motive force for propelling the automobile and the drive train includes a transmission, drive shaft, differential, and driven axles. The transmission, which is rotationally coupled with the engine, allows the automobile to be propelled at various speeds. The drive shaft transmits rotary motion from the transmission to the differential, which couples the drive shaft and the driven axles. The driven axles are attached to the driven wheels and, thus, are supplied with the motive force from the engine.

Such systems used to provide a motive force to wheels of ground vehicles are often large, heavy and complex. In applications wherein it is desirable for some or all of the wheels to be capable of being driven independently (i.e., at different speeds), the complexity and size of the motive force system may increase dramatically. For example, in vehicles with a single engine or motor, a transmission may be required for each of the wheels if they are to be capable of being driven independently. Such complex systems often are difficult to install and maintain and may be prone to failure merely due to their complexity. Conventional systems may also limit the types of suspensions possible for the vehicle, due to difficulties encountered in routing power transmitting elements therethrough.

Further, conventional vehicles often experience a jolt or hesitation during transmission shifting, which may be undesirable depending upon the use of the vehicle. For example, if the vehicle is being used to transport a gun or the like, such jolting or hesitation may decrease the accuracy of the gun, if it is fired while the vehicle is being operated.

The present invention is directed to overcoming, or at least reducing, the effects of one or more of the problems set forth above.

SUMMARY OF THE INVENTION

In one aspect of the present invention, a hub drive is provided. The hub drive includes an in-hub motor and a shifting in-hub transmission coupled with the motor.

In another aspect of the present invention, a hub drive wheel assembly is provided. The hub drive wheel assembly includes a wheel comprising a hub, an in-hub motor, and a shifting in-hub transmission having an input attached to the motor and an output attached to the wheel.

In yet another aspect of the present invention, a vehicle is provided. The vehicle includes a chassis, a wheel comprising a hub, an in-hub motor, and a shifting in-hub transmission having an input attached to the motor and an output attached to the wheel for rotating the wheel with respect to the chassis.

In another aspect of the present invention, a hub drive wheel assembly is provided. The hub drive wheel assembly includes a wheel comprising a hub and means for turning the wheel at a plurality of speeds disposed in the hub.

In yet another aspect of the present invention, a method is provided. The method includes providing a shifting transmission and a motor coupled with the transmission in a hub of a wheel, providing electrical power to the motor, and rotating the motor with the electrical power. The method further includes rotating the transmission with the motor and rotating the wheel with the transmission.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 1:
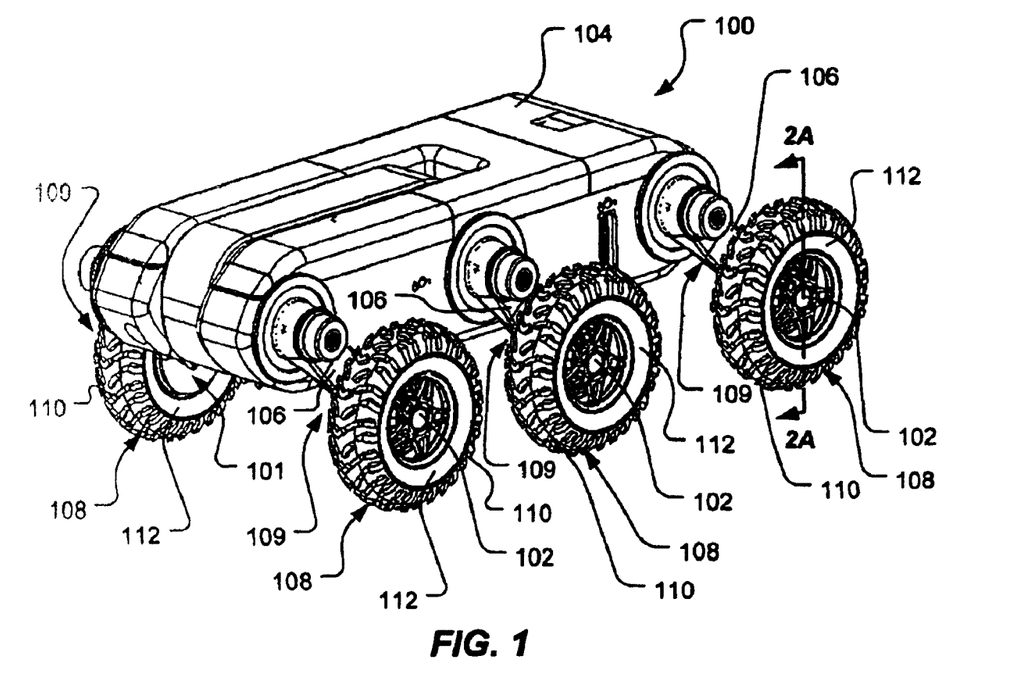
FIG. 1 is a pictorial view of a vehicle employing several hub drives, each hub drive according to the present invention.

FIG. 1 is a pictorial view of a vehicle 100 according to the present invention. The vehicle 100 comprises a plurality of wheels 108 that, when rotated while in contact with a surface, allows the vehicle to traverse the surface. Each of the wheels 108 is rotated with respect to the remainder of the vehicle 100 by a hub drive 101, which is better illustrated in FIGS. 2A and 3–5. Thus, the vehicle 100 includes a plurality of hub drives 101, each disposed in a hub 102 of each of the wheels 108. In the illustrated embodiment, the vehicle 100 includes a chassis 104 to which a plurality of rotatable suspension arms 106 are mounted. Each of the wheels 108 is rotatably coupled with each of the suspension arms 106 and driven by one of the hub drives 101 to propel the vehicle across a surface, such as a ground surface, when at least some of the wheels 108 are in contact therewith.

The chassis 104 provides the structure for vehicle integration with optimal stiffness, payload protection and thermal management. The chassis 104 may house, for example, a power plant (not shown) for powering the vehicle 100, a control system (not shown) for controlling the vehicle 100, a payload (not shown) of the vehicle 100, and the like. While the vehicle 100 is shown as having a particular configuration and/or as including particular elements, such as the suspension arms 106, the present invention is not so limited. Rather, the hub drive 101 hub drive 101 may be used to rotatably couple any suitable component of a ground vehicle, such as a chassis, a suspension arm, or the like, with the wheel 108.

In the illustrated embodiment, a wheel assembly 109 comprises the suspension arm 106, components of the vehicle 100 to couple the suspension arm to the chassis 104, the wheel 108, and the hub drive 101. In other embodiments of the vehicle 100 that omit structures such as the suspension arm 106, the wheel assembly may comprise the wheel 108 and the hub drive 101.

In the particular embodiment illustrated in FIG. 1, each of the wheels 108 further comprises a tire 110 mounted to a rim 112. The tire 110 may comprise any suitable tire known to the art, such as a pneumatic tire, a semi-pneumatic tire, a solid tire, or the like.

FIGS. 2A and 3–5 are cross-sectional, side views depicting the hub drive 101 in park mode, high speed mode, neutral mode, and low speed mode, respectively. The hub drive 101 includes a motor 202, such as a traction drive motor, and a transmission 204 having an input attached to the motor 200 and an output attached to the rim 112 of the wheel 108, each being disposed within the wheel 108 and, in the illustrated embodiment, being disposed within the rim 112. The motor 202, which acts as a traction drive motor, comprises a stator 206, attached to the vehicle 100 via a hub casing 208, and a rotor 210, attached to a rotor hub 212. In various embodiments the motor 202 may comprise a variable reluctance motor, a DC brushless motor, a permanent magnet motor, or the like. In one embodiment, electrical power is provided to the motors 202 by a series hybrid power plant comprising a commercial, off-the-shelf-based single cylinder air-cooled DI diesel engine (not shown) coupled with a commercial, off-the-shelf-based generator (not shown) disposed in the chassis 104 (shown in FIG. 1). The power plant is used in conjunction with one or more strings of electrical energy storage devices (not shown), such as lead-acid or lithium-ion batteries or the like, also disposed in the chassis 104, in a series-hybrid configured power train with sufficient buffering and storage in the power and energy management systems. The present invention, however, is not limited to use with the above-described power plant. Rather, any suitable electrical power source may be used to supply power to the motors 202.

Still referring to FIGS. 2A and 3–5, the transmission 204 comprises an epicyclic gear train 214, which further includes a sun gear 216, a plurality of planetary gears 218 engaged with the sun gear 216, and a ring gear 220 engaged with the planetary gears 218. Each of the planetary gears 218 is held in position by a spindle 226 and a carrier cover plate 222 via a shaft 224. The spindle 226 and the carrier cover plate 222 implement a planetary gear carrier 227. The rotor hub 212, which is attached to the rotor 210 as described above, is coupled with the sun gear 216. Thus, as the motor 202 operates, the rotor 210 is caused to rotate with respect to the stator 206 and, correspondingly, rotates the sun gear 216. In the illustrated embodiment, the planetary gear carrier 227 is attached to the rim 112 by a spindle 226 and, thus, power from the motor 202 is transmitted from the motor 202, through the epicyclic gear train 214, to the rim 112.

Various outputs or operating modes may be accomplished by placing the epicyclic gear train 214 in different operational configurations. For example, the hub drive 101 may be placed in park mode, shown better in FIGS. 2A–2B, by locking the planetary gear carrier 227 to the sun gear 216 and by locking the ring gear 220 to the hub casing 208, as will be discussed further below, to prevent the epicyclic gear train 214 from transmitting power therethrough. Further, the hub drive 101 may be placed in high speed mode, illustrated better in FIG. 3, by locking the planetary gear carrier 227 to the sun gear 216 and by allowing the ring gear 220 to rotate freely, causing the spindle 226 to rotate at the same speed as the rotor 210.

Figure 4:
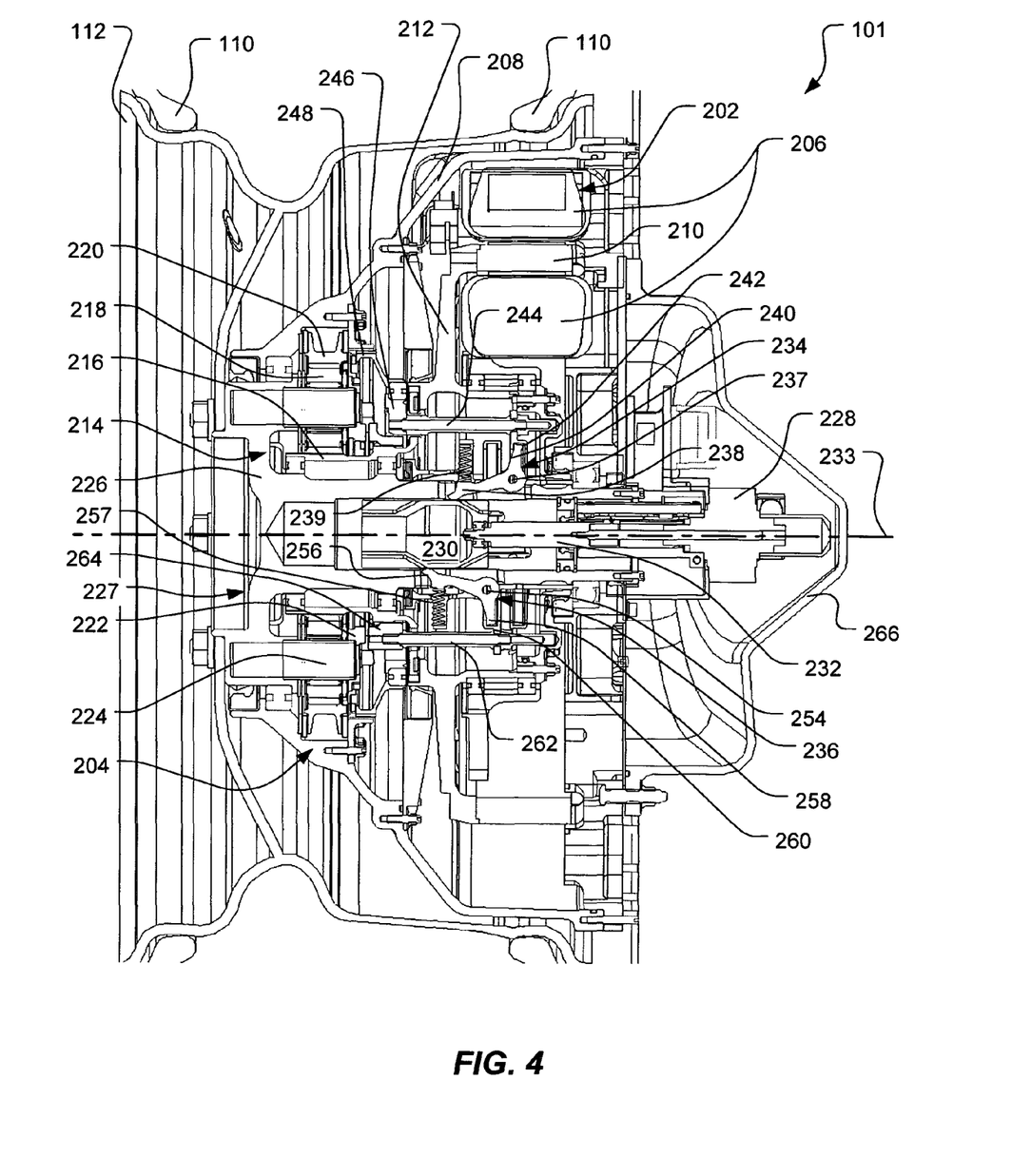

Further, to place the hub drive 101 in neutral mode, illustrated better in FIG. 4, the spindle 226 is allowed to rotate freely by causing the planetary gear carrier 227 to rotate independently of the sun gear 216 and by causing the ring gear 220 to rotate freely. The hub drive 101 may be placed in low speed mode, illustrated better in FIG. 5, by reducing the rotational speed of the spindle 226 with respect to the rotor 210. In this configuration, the planetary gear carrier 227 is allowed to rotate independently of the sun gear 216 and the ring gear 220 is locked to the hub casing 208, which causes the sun gear 216 to rotate the planetary gears 218 against the fixed ring gear 220, driving the planetary gear carrier 227 and the spindle at a lower speed than the sun gear 216.

To effect these configurations, the transmission 204 illustrated in FIGS. 2A–5 includes a shift motor 228 that linearly actuates a shift drum 230 via a shift pin 232 along an axis 233. As the shift drum 230 is moved to various positions by the shift motor 228, the epicyclic gear train 214 is shifted into the various operating modes by pivoting a first shift lever 234 and/or a second shift lever 236 via the shift drum 230. Referring now to FIG. 2B, which provides an enlarged view of a portion of the transmission 204 of FIG. 2A, the first shift lever 234 is pivotably mounted by a pin 237, such that a first leg 238 of the first shift lever 234 is biased against the shift drum 230 by a first biasing member 239. A second leg 240 of the first shift lever 234 extends into a first shift ring 242, which is attached to a first shift spacer 244. The first shift spacer 244 is attached to a ring gear dog hub 246, which is attached to a ring gear dog ring 248.

Figure 5:
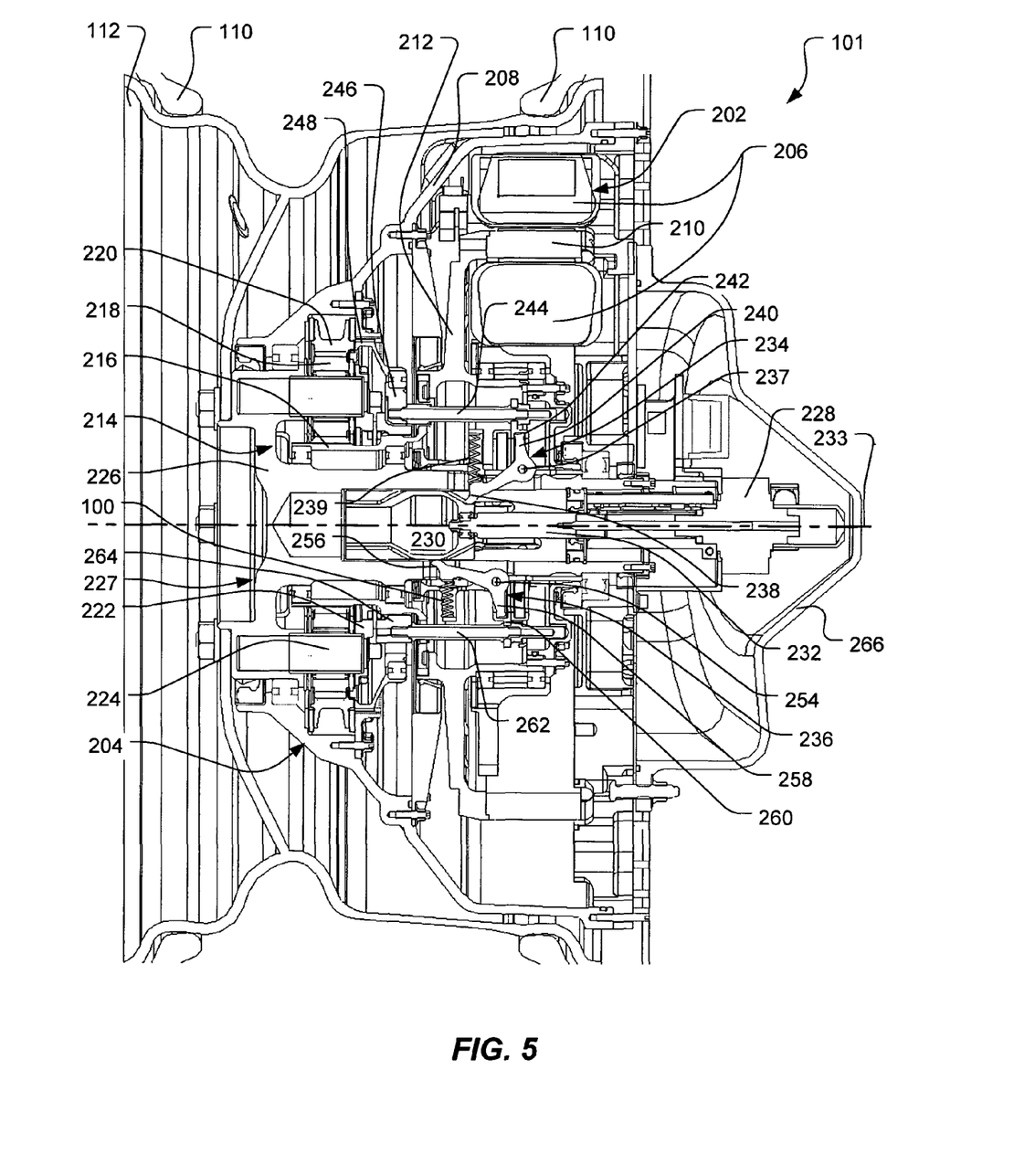

The ring gear dog ring 248 may be selectively contacted to the ring gear 220 to lock the ring gear 220 to the hub casing 208. For example, when the first shift lever 234 is pivoted by the shift drum 230 such that the first leg 238 thereof moves away from the axis of motion 233 of the shift drum 230, the ring gear dog ring 248 is disengaged from the ring gear 220, as shown in FIGS. 3 and 4. Conversely, when the first shift lever 234 is pivoted by the shift drum 230 such that the first leg 238 thereof moves toward the axis of motion 233 of the shift drum 230, the ring gear dog ring 248 is engaged with the ring gear 220, as depicted in FIGS. 2A, 2B, and 5.

Similarly, the transmission 204 further comprises a second shift lever 252 that is pivotably mounted by a pin 254, such that a first leg 256 of the second shift lever 252 is biased against the shift drum 230 by a second biasing member 257. A second leg 258 of the second shift lever 252 extends into a second shift ring 260, which is attached to a second shift spacer 262. The second shift spacer 262 is attached to a planetary carrier dog ring 264. The planetary carrier dog ring 264 may be selectively contacted to the planetary carrier 222 to lock the planetary gear carrier 227 to the sun gear 216. For example, when the second shift lever 252 is pivoted by the shift drum 230 such that the first leg 256 thereof moves away from the axis of motion 233 of the shift drum 230, the planetary carrier dog ring 264 is disengaged from the planetary gear carrier 227, as shown in FIGS. 4 and 5. Conversely, when the second shift lever 252 is pivoted by the shift drum 230 such that the first leg 256 moves toward the axis of motion 233 of the shift drum 230, the planetary carrier dog ring 264 is engaged with the planetary gear carrier 227, as shown in FIGS. 2A, 2B, and 3. A cover 266 is employed in one embodiment to protect the hub drive 101 from debris. In one embodiment, the hub drive 101 is sealed to inhibit the flow of fluids, such as water, into the motor 202 and the transmission 204. Thus, the hub drive 101 may be operated while fully immersed in such fluids.

The vehicle 100 is also capable of being air-dropped from an aircraft using non-palletized procedures. The hub drive 101 is capable of withstanding forces generated by such an air-drop and, further, is capable of withstanding the forces of a vehicle 100 rollover. For example, gap clearances between elements of the hub drive 100 are set to inhibit damage and jamming that might otherwise occur during high impact and/or high vibration events.

Figure 2A:
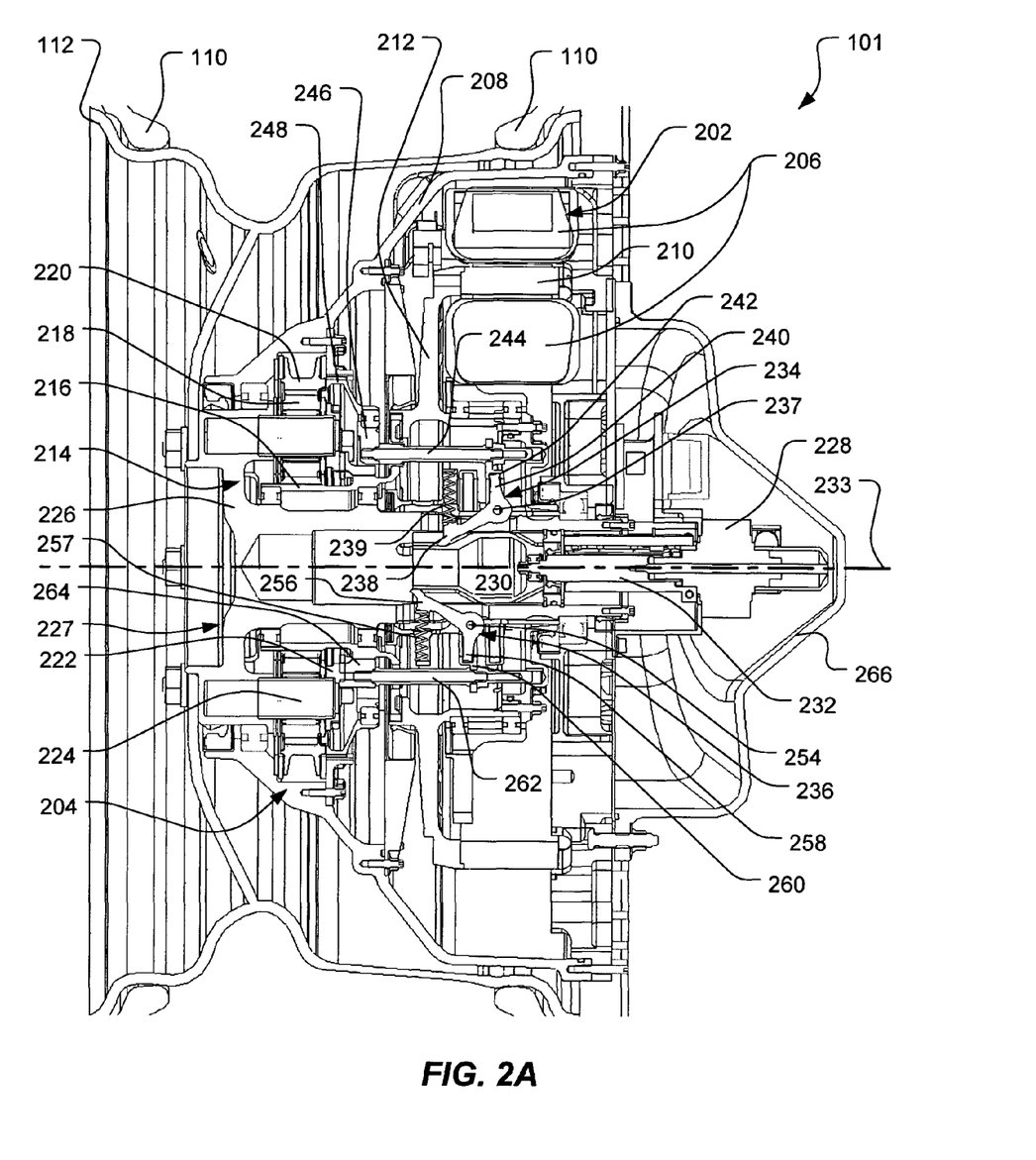
FIG. 2A is a cross-sectional, side view of a hub drive of FIG. 1 in park mode.
Figure 2B:
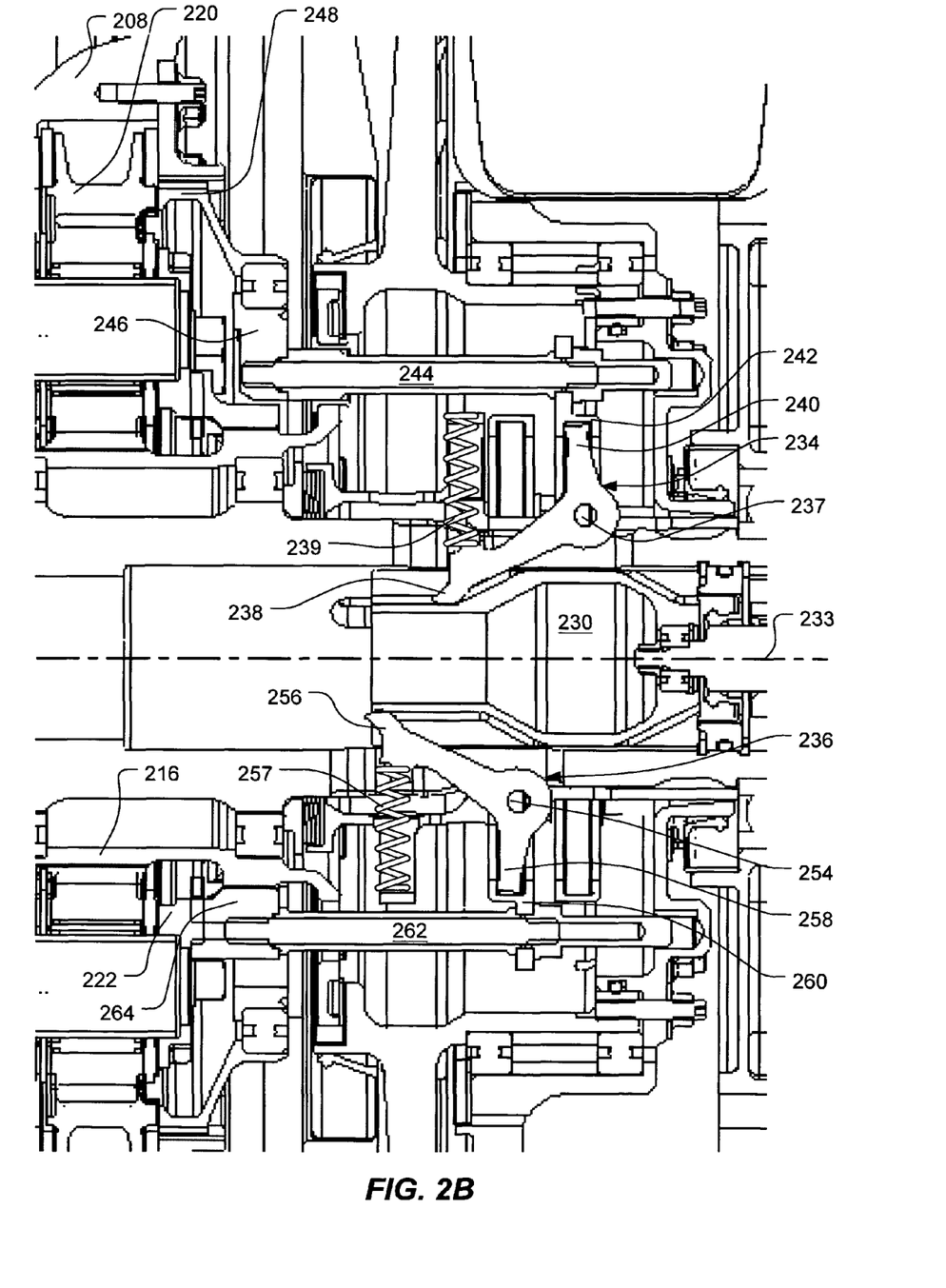
FIG. 2B is an enlarged view of a portion of FIG. 2A.
Figure 3:
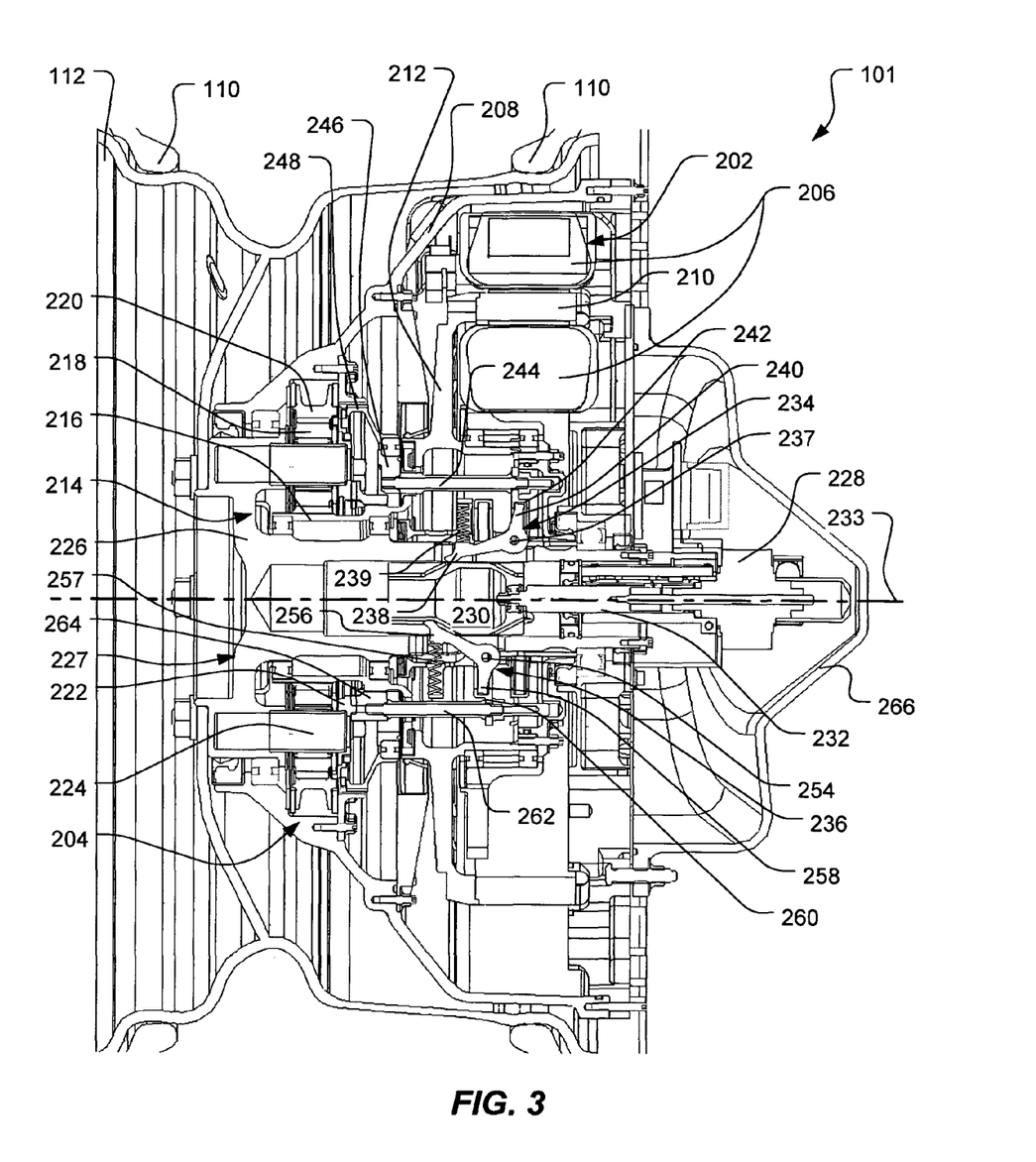
FIGS. 3–5 are cross-sectional, side views of the hub drive of FIG. 1 in high speed mode, neutral mode, and low speed mode, respectively.

FIGS. 2A–2B illustrate the hub drive 101 in its park configuration. In the illustrated embodiment, the shift drum 230 is in its far outboard position. In this configuration, the first shift lever 234 is pivoted such that the planetary carrier dog ring 264 is engaged with the planetary gear carrier 227, thus locking the planetary gear carrier 227 to the sun gear 216. Further, the second shift lever 236 is pivoted such that the ring gear dog ring 248 is engaged with the ring gear 220, thus locking the ring gear 220 to the hub casing 208. As a result, the rotor 210 and the stator 206 of the motor 202 are inhibited from moving relative to each other and the spindle 226 is inhibited from rotating.

FIG. 3 depicts the hub drive 101 in its high speed configuration. In the illustrated embodiment, the shift drum 230 is positioned inboard of its park position, shown in FIG. 2A. In this configuration, the first shift lever 234 is pivoted such that the planetary carrier dog ring 264 is engaged with the planetary gear carrier 227, thus locking the planetary gear carrier 227 to the sun gear 216. Further, the second shift lever 236 is pivoted such that the ring gear dog ring 248 is disengaged from the ring gear 220, thus allowing the ring gear 220 to rotate freely. As a result, the spindle 226 is locked to the ring gear 220, creating a direct drive. In other words, the spindle 226 and the rim 112 rotates at the same speed as the motor 202.

FIG. 4 depicts the hub drive 101 in its neutral configuration. In the illustrated embodiment, the shift drum 230 is positioned inboard of its high speed position, shown in FIG. 3. In this configuration, the first shift lever 234 is pivoted such that the planetary carrier dog ring 264 is disengaged from the planetary gear carrier 227, allowing the planetary gear carrier 227 to rotate independently of the sun gear 216. Further, the second shift lever 236 is pivoted such that the ring gear dog ring 248 is disengaged from the ring gear 220, thus allowing the ring gear 220 to rotate freely. As a result, the spindle 226 may rotate independently of any rotation by the motor 202.

FIG. 5 shows the hub drive 101 in its low speed configuration. In the illustrated embodiment, the shift drum 230 is in its far inboard position. In this configuration, the first shift lever 234 is pivoted such that the planetary carrier dog ring 264 is disengaged from the planetary gear carrier 227, thus allowing the planetary gear carrier 227 to rotate independently of the sun gear 216. Further, the second shift lever 236 is pivoted such that the ring gear dog ring 248 is engaged with the ring gear 220, thus locking the ring gear 220 to the hub casing 208. As a result, the sun gear 216 rotates the planetary gears 218 against the fixed ring gear 220, thus driving the planetary gear carrier 227 and the spindle 226 at a lower speed than the motor 202.

While the shift drum 230 is described above as being in a particular inboard/outboard position corresponding to a particular operational mode, the present invention is not so limited. Rather, the scope of the present invention encompasses various designs of the hub drive 101 in which the shift drum 230 is moved to positions different than those described above to achieve the various operational modes thereof. For example, one embodiment of the hub drive 101 may be configured such that the shift drum 230 operates obversely to the operation shown in FIGS. 2A–5. In such an embodiment, the shift drum 230 may be moved from a far inboard position through intermediate positions to a far outboard position to shift the hub drive 101 from the park mode, the high speed mode, the neutral mode, to the low speed mode. Thus, the particular embodiments of the hub drive 101 disclosed above may be altered or modified, and all such variations are considered within the scope of the present invention.

Further, while the biasing members 239, 257 are illustrated in FIGS. 2A–5 as being helical springs, the present invention is not so limited. Rather, the scope of the present invention encompasses any suitable chosen member for biasing the legs 238, 256 of the shift levers 234, 252, respectively, against the shift drum 230.

FIGS. 2A–5 illustrate one first shift lever 234 extending into the first shift ring 242 and one second shift lever 252 extending into the second shift ring 260. The present invention, however, is not so limited. Rather, in various embodiments, the transmission 204 may comprise a plurality of first shift levers 234 extending into the first shift ring 242 and biased against the shift drum 230 and a plurality of second shift levers 252 extending into the second shift ring 260 and biased against the shift drum 230. For example, in one embodiment, the transmission 204 comprises three first shift levers 234 extending into the first shift ring 242 and biased against the shift drum 230 and three second shift levers 252 extending into the second shift ring 260 and biased against the shift drum 230. The first shift levers 234 and the second shift levers 252 may be radially spaced apart around the shift drum 230.

The hub drive 101 is capable of rotating the wheel 108 (each shown in FIG. 1) in either direction. The rotational direction of the transmission 204 may be changed by changing the rotational direction of the motor 202. The rotational direction of the motor 202 may be changed by techniques known to the art depending upon the type of motor used.

Changing the rotational direction of the motor 202 and, thus, the rotational direction of the hub drive 101, may also be used to brake the hub drive 101 by using the motor 202 as a generator to develop negative "braking" torque. For example, if the hub drive 101 is rotating in a first direction and the motor 202 is switched such that it is urged to rotate in a second direction, the motor 202 will be "backdriven" to brake the hub drive 101.

Thus, by combining the shifting capability of the transmission 204 and the capability of the motor 202 to rotate in both directions, the hub drive 101 is capable of rotating the wheel 108 in either direction and in the low speed mode (illustrated in FIG. 5) or the high speed mode (illustrated in FIG. 3). Further, the hub drive 101 is capable of braking (using the motor 200 as a generator to develop negative "braking" torque) while rotating in either direction in the low speed mode or the high speed mode. Further, by placing the hub drive 101 in the park mode, the hub drive 101 is inhibited from rotating and no additional "parking brake" is required. Yet further, by placing the hub drive 101 in the neutral mode, the wheel 108 may rotate freely, irrespective of the rotation of the motor 202. By rotating the hub drives 101 attached to a first side of the vehicle 100 in a first direction and the hub drives 101 attached to a second side of the vehicle 100 in a second direction counter to the first direction, the vehicle may be "skid steered" along a non-linear path, as some or all of the wheels 108 skid as they roll along a surface.

The hub drives 101 further enable the vehicle 100 to be driven more smoothly. Conventional vehicles often experience a jolt or hesitation during transmission shifting, which may be undesirable depending upon the use of the vehicle. In various embodiments, the hub drives 101 may be shifted in a staggered fashion to reduce such jolts and hesitation. In other words, the hub drives 101, if so desired, may be shifted one at a time or in groups, but not all once, to reduce jolting and hesitation during shifting. However, the hub drives 101 may, if desired, be shifted at the same time.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A hub drive, comprising:
    an in-hub motor comprising:
        a stator; and
        a rotor;
    a shifting in-hub transmission coupled with the motor;
        a sun gear coupled with the rotor;
        a plurality of planetary gears engaged with the sun gear;
        a planetary gear carrier for holding the planetary gears in place and for providing an output for the transmission; and
        a ring gear engaged with the plurality of planetary gears;
    a shift drum;
    a shift motor for linearly actuating the shift drum;
    a ring gear dog ring;
    at least one first shift lever biased against the shift drum for selectively engaging the ring gear dog ring with the ring gear depending upon the position of the shift drum;
    a planetary carrier dog ring; and
    at least one second shift lever biased against the shift drum for selectively engaging the planetary carrier dog ring with the planetary gear carrier depending upon the position of the shift drum.

2. A hub drive, according to claim 1, such that the transmission is in a park mode when the ring gear dog ring is engaged with the ring gear and the planetary carrier dog ring is engaged with the planetary gear carrier.

3. A hub drive, according to claim 2, such that the transmission is in a high-speed mode when the ring gear is disengaged from the hub casing and the sun gear is engaged with the planetary gear carrier.

4. A hub drive, according to claim 2, such that the transmission is in a neutral mode when the ring gear dog ring is disengaged from the ring gear and the planetary carrier dog ring is disengaged from the planetary gear carrier.

5. A hub drive, according to claim 2, such that the transmission is in a low speed mode when the ring gear is engaged with the hub casing and the sun gear is engaged with the planetary gear carrier.

6. A hub drive wheel assembly, comprising:
    a wheel comprising a hub;
    an in-hub motor comprising:
        a stator; and
        a rotor; and
    a shifting in-hub transmission having an input attached to the motor and an output attached to the wheel, the transmission comprising:
        a sun gear coupled with the rotor;
        a plurality of planetary gears engaged with the sun gear;
        a planetary gear carrier for holding the planetary gears in place and for providing an output for the transmissiom; and
        a ring gear engaged with the plurality of planetary gears;
    a shift drum;
    a shift motor for linearly actuating the shift drum;
    a ring gear dog ring;
    at least one first shift lever biased against the shift drum for selectively engaging the ring gear dog ring with the ring gear depending upon the position of the shift drum;
    a planetary carrier dog ring; and
    at least one second shift lever biased against the shift drum for selectively engaging the planetary carrier dog ring with the planetary gear carrier depending upon the position of the shift drum.

\* \* \* \* \*